(12) United States Patent
Ariapad et al.

(10) Patent No.: US 12,078,066 B1
(45) Date of Patent: Sep. 3, 2024

(54) PRESSURE CONTROL SYSTEM FOR A CLOSED-CYCLE ENGINE

(71) Applicant: Hyliion Holdings Corp, Cedar Park, TX (US)

(72) Inventors: Alex William Ariapad, Cincinnati, OH (US); Michael Robert Notarnicola, Cincinnati, OH (US); Joshua Tyler Mook, Loveland, OH (US)

(73) Assignee: Hyliion Holdings Corp, Cedar Park, TX (US)

( * ) Notice: Subject to any disclaimer, the term of this patent is extended or adjusted under 35 U.S.C. 154(b) by 0 days.

(21) Appl. No.: 18/341,149

(22) Filed: Jun. 26, 2023

(51) Int. Cl.
| | | |
|---|---|---|
| *F01B 29/10* | (2006.01) | |
| *F02G 5/00* | (2006.01) | |
| *F15B 1/26* | (2006.01) | |
| *F16C 32/06* | (2006.01) | |

(52) U.S. Cl.
CPC ............ *F01B 29/10* (2013.01); *F02G 5/00* (2013.01); *F15B 1/265* (2013.01); *F16C 32/0614* (2013.01)

(58) Field of Classification Search
CPC .. F01B 29/10; F02G 5/00; F15B 1/265; F16C 32/0614
See application file for complete search history.

(56) References Cited

U.S. PATENT DOCUMENTS

| | | | |
|---|---|---|---|
| 3,035,879 A | 5/1962 | Hanny et al. | |
| 3,296,808 A | 1/1967 | Malik | |
| 3,355,882 A | 12/1967 | Kohler et al. | |
| 3,552,120 A | 1/1971 | Beale | |
| 3,777,718 A | 12/1973 | Pattas | |
| 4,026,114 A | 5/1977 | Belaire | |
| 4,030,297 A | 6/1977 | Kantz et al. | |
| 4,077,216 A | 3/1978 | Cooke-Yarborough | |
| 4,183,214 A | 1/1980 | Beale et al. | |
| 4,199,945 A | 4/1980 | Finkelstein | |
| 4,273,244 A * | 6/1981 | Jensen | B66C 23/80 180/125 |

(Continued)

FOREIGN PATENT DOCUMENTS

| | | |
|---|---|---|
| DE | 3416271 A1 | 11/1985 |
| JP | S5866144 U | 5/1983 |

(Continued)

OTHER PUBLICATIONS

American Stirling Company, Regenerators, 10 Pages. https://www.stirlingengine.com/regenerators/.

(Continued)

*Primary Examiner* — Hoang M Nguyen
(74) *Attorney, Agent, or Firm* — Dority & Manning, P.A.

(57) ABSTRACT

A method of pressurizing a closed-cycle engine includes performing a non-steady state operation in which a working fluid flows to or from a pressurized tank: i) to or from a plurality of sumps defined by respective ones of a plurality of cylinder-piston assemblies of the closed-cycle engine; or ii) to or from one or more air bearings associated with each one of the plurality of the cylinder-piston assemblies; or iii) both and performing, before and/or after performing the non-steady state operation, a steady-state operation in which the working fluid flows through the plurality of sumps and the one or more air bearings along a steady-state loop that is fluidly decoupled from the pressurized tank.

20 Claims, 13 Drawing Sheets

(56) References Cited

U.S. PATENT DOCUMENTS

| | | | | |
|---|---|---|---|---|
| 4,278,624 | A | * | 7/1981 | Kornylak ................ B29C 31/00 425/149 |
| 4,284,174 | A | * | 8/1981 | Salvana .................. F16C 19/52 60/39.08 |
| 4,387,568 | A | | 6/1983 | Dineen |
| 4,545,738 | A | | 10/1985 | Young |
| 4,644,851 | A | | 2/1987 | Young |
| 4,717,405 | A | | 1/1988 | Budliger |
| 4,723,411 | A | | 2/1988 | Darooka et al. |
| 4,945,726 | A | | 8/1990 | Beale |
| 5,356,225 | A | * | 10/1994 | Hanes ................. F16C 32/0614 384/114 |
| 7,134,279 | B2 | | 11/2006 | White et al. |
| 8,720,198 | B2 | | 5/2014 | Wood |
| 8,820,068 | B2 | | 9/2014 | Dadd |
| 9,689,344 | B1 | | 6/2017 | Gedeon |
| 2022/0195959 | A1 | | 6/2022 | VandeVoorde et al. |

FOREIGN PATENT DOCUMENTS

| | | |
|---|---|---|
| JP | H06147009 A | 5/1994 |
| JP | 2000045867 A | 2/2000 |
| JP | 2004020048 A | 1/2004 |

OTHER PUBLICATIONS

Bin-Nun et al., Low Cost and High Performance Screen Laminate Regenerator Matrix, ScienceDirect, FLIR Systems, MA, vol. 44, Issues 6-8, Jun.-Aug. 2004, pp. 439-444. https://www.sciencedirect.com/science/article/abs/pii/S0011227504000700.

Bright Hub Engineering, Oil Piston Cooling, Oct. 19, 2009, 6 Pages. https://www.brighthubengineering.com/marine-engines-machinery/52783-how-are-marine-pistons-cooled-with-oil/.

Conner, 3D Printed Stirling Engine, Solar Heat Engines, Simulate, Analyze, Design, Build, and Test Solar-Powered Engines, Oct. 29, 2012, 12 Pages. http://www.solarheatengines.com/2012/10/29/3d-printed-stirling-engine/.

Conner, A Regenerator for the 3D Printed PE 2 Stirling Engine, Solar Heat Engines, Simulate, Analyze, Design, Build, and Test Solar-Powered Engines, Dec. 18, 2012, 9 Pages. http://www.solarheatengines.com/2012/12/18/a-regenerator-for-the-3d-printed-pe-2-stirling-engine/.

Deetlefs, Design, Simulation, Manufacture and Testing of a Free-Piston Stirling Engine, Thesis, Department of Mechatronic Engineering Stellenbosch University, Scholar Sun, South Africa, Dec. 2014, 138 Pages. https://scholar.sun.ac.za/bitstream/handle/10019.1/95922/deetlefs_design_2014.pdf?sequence=3&isAllowed=y.

Defense Visual Information Distribution Service (DVIDS), MOD II Automotive Stirling Engine, NASA, C-1986-3706, Washington, DC, 2 pages. https://www.dvidshub.net/image/844058/mod-ii-automotive-stirling-engine.

Defense Visual Information Distribution Service (DVIDS), MOD II Automotive Stirling Engine, NASA, C-1986-3724, Washington, DC, 2 pages. https://www.dvidshub.net/image/841262/mod-ii-automotive-stirling-engine.

Defense Visual Information Distribution Service (DVIDS), MOD II Automotive Stirling Engine, NASA, C-1986-3725, Washington, DC, 2 pages. https://www.dvidshub.net/image/759360/mod-ii-automotive-stirling-engine.

Devitt, Restriction and Compensation of Gas Bearings—Bently Bearings by Newway, Aston, PA, 5 Pages. https://bentlybearings.com/restriction-and-compensation/.

Dudareva et al., Thermal Protection of Internal Combustion Engines Pistols, Science Direct, Procedia Engineering, vol. 206, 2017, pp. 1382-1387. https://www.sciencedirect.com/science/article/pii/S1877705817353341.

Electropaedia, Battery and Energy Technologies, Energy Conversion and Heat Engines, Woodbank Communications Ltd., Chester, United Kingdom, 2005, 11 Pages. https://www.mpoweruk.com/heat_engines.htm.

Enerlyt Stirling Engine, Enerlyt, Glowing-Isothermal-Mechanical-Stirling-Arranged-Motor, Enerlyt Technik GmbH, Potsdam, 2012, 13 Pages. http://www.enerlyt.de/english/pdf/en_motorbeschreibung_040413.pdf.

Fouzi, Chapter 6: Piston and Piston Rings, DJA3032 Internal Combustion Engine, Politeknik Malaysia, 201, 5 Pages. https://www.slideshare.net/mechanical86/dja3032-chapter-6.

Free-Piston Engine Range Extender Technology, Sir Joseph Swan Centre for Energy Research, 2016. (VIDEO) https://www.youtube.com/watch?v=u4b0_6byuFU.

Garcia-Santamaria et al., A German Inverse Woodpile Structure with a Large Photonic Band Gap, Advanced Materials Communication, Wiley InterScience, 2007, Adv. Mater. 0000, 00, pp. 1-5. http://colloids.matse.illinois.edu/articles/garcia_advmat_2007.pdf.

General Electrical—GE Power, Breaking the Power Plant Efficiency Record, 2016, 4 Pages. https://www.ge.com/power/about/insight/articles/2016/04/power-plant-efficiency-record.

Georgescu, Rotary Engine, 2007. (Video Only) https://www.youtube.com/watch?v=ckuOugFH68o.

Gibson, et al., Cellular Solids Structure and Properties, Cambridge University Press, $2^{nd}$ Edition, 1997. (Web Link Only) https://doi.org/10.1017/CBO9781139878326.

Giphy, Engine Piston GIF, 1 Page. https://giphy.com/gifs/engine-hybrid-piston-10YvqVUCHx2HC.

Green Car Congress, New Toroidal Internal Combustion Engine Promises 20:1 Power-to-Weight-Ratio Energy, Technologies, Issues and Polices for Sustainable Mobility, Apr. 2006, 2 Pages. https://www.greencarcongress.com/2006/04/new_toroidal_in.html.

Hoegel et al., Theoretical Investigation of the Performance of an Alpha Stirling Engine for Low Temperature Applications, Conference: ISEC $15^{th}$ International Stirling Engine Conference, ResearchGate, New Zealand, Jan. 2012, 10 Pages. https://www.researchgate.net/publication/256706755_Theoretical_investigation_of_the_performance_of_an_Alpha_Stirling_engine_for_low_temperature_applications.

Honeywell Aerospace, Ultra Long-Life, Flight Qualified Technology for High Speed Imaging and Sensing Infra-Red Detectors, Stirling Cycle Cryocoolers, Auxiliary Power and Thermal, Honeywell Aerospace. Stirling Cycle Cryocoolers. https://aerospace.honeywell.com/en/products/auxiliary-power-and-thermal/stirling-cycle-cryocoolers.

Howden, Reciprocating Compressor C series—animation, Jun. 2017. (Video Only) https://www.youtube.com/watch?v=owNOdUBL37U&feature=youtu.be.

http://www.hybrid-engine-hope.com/media/pagini/95_0071d630dba777d16e9a770de27060e6.gif (Web Link Only).

Huang, Toroidal Engine Ver:2.0, 2017. (Video Only) https://www.youtube.com/watch?v=n5L0Zc6Ic8Y&feature=youtu.be.

Ishikawa et al., Development of High Efficiency Gas Turbine Combined Cycle Power Plant, Power Systems Headquarters, Mitsubishi Heavy Industries, Ltd., Technical Review, vol. 45, No. 1, Mar. 2008, pp. 15-17. http://courses.me.metu.edu.tr/courses/me476/downloads/476s08ProjectP14GtTemp.pdf.

Luna, Investigation of Porous Metals as Improved Efficiency Regenerators, The University of Sheffield, Doctor of Philosophy Thesis, Mar. 2016, 261 Pages. http://etheses.whiterose.ac.uk/13111/1/Thesis%20Elizondo-Luna.pdf.

Microgen Engine Corporation. Technology, 2016, 4 Pages. https://www.microgen-engine.com/technology/technology/.

Murphy, Iav Sees Huge Potential With 3D-Printed Pistons, Wards Auto, Apr. 12, 2018, 6 Pages. https://www.wardsauto.com/engines/iav-sees-huge-potential-3d-printed-pistons.

Ni et al., Improved Simple Analytical Model and Experimental Study of a 100 W B-Type Stirling Engine, Applied Energy, vol. 169, 2016, pp. 768-787. https://www.researchgate.net/publication/296632477_Improved_Simple_Analytical_Model_and_experimental_study_of_a_100W_b-type_Stirling_engine/figures?lo=.

Nightingale, Automotive Stirling Engine, Mod II Design Report, DOE/NASA/0032-28, NASA CR-175106, TI86ASE58SRI, New York, 1986, 54 Pages. https://ntrs.nasa.gov/archive/nasa/casi.ntrs.nasa.gov/19880002196.pdf.

O'Dell, SuperTruck Program Scores Big, Head into Second 5—Year Phase, Trucking.com, 2016, 7 Pages. https://www.trucks.com/2016/10/31/supertruck-program-5-year-phase/.

(56) References Cited

OTHER PUBLICATIONS

Owczarek, On the Design of Lubricant Free Piston Compressors, Nonlinear Solid Mechanics, Faculty of Engineering Technology, Thesis, University of Twente, Enschede, Sep. 17, 2010. (Abstract Only). https://research.utwente.nl/en/publications/on-the-design-of-lubricant-free-piston-compressors.

Panesar et al., Strategies for Functionally Graded Lattice Structures Derived Using Topology Optimisation for Additive Manufacturing, ScienceDirect, Additive Manufacturing, vol. 19, Jan. 2018, pp. 81-94. https://doi.org/10.1016/j.addma.2017.11.008.

Park et al., Thermal/Fluid Characteristics of Isotropic Plain—Weave Screen Laminates as Heat Exchange Surfaces, AIAA 2002-0208, 2002, pp. 1-9 https://wolfweb.unr.edu/~rawirtz/Papers/AIAA2002-0208.pdf.

Penswick et al., Duplex Stirling Machines, Sunpower Incorporated 19th Annual Intersociety Energy Conversion Engineering Conference, QP051082-A, vol. 3, No. CONF-840804, United States, 1984, 7 Pages. https://www.ohio.edu/mechanical/stirling/engines/Duplex-Stirling-Machines.pdf.

Pneumatic Round Body Cylinder—SRG_SRG Series, Parker, Richland MI, 3 Pages. http://ph.parker.com/us/en/pneumatic-round-body-cylinder-srg.srgm-series.

Qiu et al., Advanced Stirling Power Generation System for CHP Application, ARPA, Temple University, Philadelphia, 5 Pages. https://arpa-e.energy.gov/sites/default/files/Temple_GENSETS_Kickoff.pdf.

Ranieri et al., Efficiency Reduction in Stirling Engines Resulting from Sinusoidal Motions, Energies, vol. 11, No. 11: 2887, 2018, 14 Pages. https://doi.org/10.3390/en11112887.

Renewable Energy, Double-Acting Stirling Engine, Stirling Engine, 1 Page. (Abstract Only) https://sites.google.com/a/emich.edu/cae546816t5/history/types/double---acting-stirling-engine.

Rodriguez Perez, Cellular Nanocomposites: A New Type of Light Weight Advanced Materials with Improved Properties, CellMat Technologies S.L. Transfer Center and Applied Technologies, Valladolid, Sep. 18-19, 2013, 35 Pages. http://crono.ubu.es/innovationh2020/pdf/cellmat.pdf.

Schonek, How big are power line losses?, Energy Management/Energy Efficiency, Schneider Electric, Mar. 25, 2013, 2 Pages. https://blog.schneider-electric.com/energy-management-energy-efficiency/2013/03/25/how-big-are-power-line-losses/.

Schwartz, The Natural Gas Heat Pump and Air Conditioner, 2014 Building Technologies Office Peer Review, ThermoLift, Inc., U.S. Department of Energy, Energy Efficiency & Renewable Energy, DE-FOA-0000823, 27 Pages. (Refer to p. 7) https://www.energy.gov/sites/prod/files/2014/11/119/BTO%202014%20Peer%20Review%20Presentation%20-%20ThermoLift%204.4.14.pdf.

Shimizu, Next Prius Will Have Engine Thermal Efficiency of 40%, XTECH, Solar Plant Business, Nikkei Business Publications, May 22, 2015, 2 Pages. https://tech.nikkeibp.co.jp/dm/english/NEWS_EN/20150522/419560/.

Stirling Engines, Solar Cell Central, 5 Pages. http://solarcellcentral.com/stirling_page.html.

Stirling Engines, Regenerators, What They Are and How They Work, American Stirling Company, 7 Pages. https://www.stirlingengine.com/regenerators/.

Thermolift, Technology—Background, The Thermodynamic Process Behind ThermoLift, ThermoLift, Inc., 3 Pages. http://www.tm-lift.com/background/.

Thimsen, Stirling Engine Assessment, 1007317, Electronic Power Research Institute (EPRI ), Palo Alto, California, 2002, 170 Pages. http://www.engr.colostate.edu/~marchese/mech337-10/epri.pdf.

Thomassen, Free Floating Piston Film (mpeg).mpg, Mar. 5, 2010. (Video Only) https://www.youtube.com/watch?v=bHFU10F0PpA.

Toptica Photonics, 2-Photon Polymerization, FemtoFiber Technology for Two-Photon Polymerization, 2 Pages. https://www.toptica.com/applications/ultrafast-studies/2-photon-polymerization/.

Toyota Motor Corporation, Inline 4 Cylinder 2.5L Injection Gasoline Engine/New Transaxle, Global Website, Dec. 6, 2016, 2 Pages. https://global.toyota/en/download/14447877/.

Tuncer et al., Structure-Property Relationship in Titanium Foams, Anadolu University, Turkey, Feb. 2011, 35 Pages. https://ocw.mit.edu/courses/materials-science-and-engineering/3-054-cellular-solids-structure-properties-and-applications-spring-2015/lecture-notes/MIT3_054S15_L13_Cellular.pdf.

Urieli, Chapter 5B—Regenerator Simple Analysis, Stirling Cycle Machine Analysis, Ohio Edu, Jan. 17, 2010, 5 Pages. https://www.ohio.edu/mechanical/stirling/simple/regen_simple.html.

Vodhanel, Characterization of Performance of a 3D Printed Stirling Engine Through Analysis and Test, Cleveland State University Engaged Scholarship@CSU, ETD Archive, 2016, 91 Pages. https://engagedscholarship.csuohio.edu/cgi/viewcontent.cgi?referer=https://www.google.com/&httpsredir=1&article=1944&context=etdarchive.

Wikipedia, Heat Engine, 8 Pages. https://en.wikipedia.org/wiki/Heat_engine.

Wikipedia, Regenerative Heat Exchanger, 3 Pages. https://en.wikipedia.org/wiki/Regenerative_heat_exchanger.

Wikipedia, Stirling Engine, 2019, 24 Pages. https://en.wikipedia.org/wiki/Stirling_engine.

Wirtz et al., High Performance Woven Mesh Heat Exchangers, Mechanical Engineering Department, University of Nevada, Reno, 2002, 8 Pages. https://apps.dtic.mil/dtic/tr/fulltext/u2/a408219.pdf.

Wirtz et al., Thermal/Fluid Characteristics of 3-D Woven Mesh Structures as Heat Exchanger Surfaces, IEEE Transactions on Components and Packaging Technologies, vol. 26, No. 1, Mar. 2003, pp. 40-47. https://pdfs.semanticscholar.org/d1a3/b4ce0baa639cf349d25d1506c3fa6118dc3e.pdf.

Wu et al., Model-based Analysis and Simulation of Regenerative Heat Wheel, ScienceDirect, Energy and Buildings, vol. 38, No. 5, May 2006, pp. 502-514. http://citeseerx.ist.psu.edu/viewdoc/download?doi=10.1.1.616.3103&rep=rep1&type=pdf.

Xie et al., Investigation on the Performances of the Gas Driven Vuilleumier Heat Pump, International Refrigeration and Air Conditioning Conference, Purdue University, School of Mechanical Engineering, 2008, 7 Pages. https://docs.lib.purdue.edu/cgi/viewcontent.cgi?referer=https://www.google.com/&httpsredir=1&article=1935&context=iracc.

\* cited by examiner

PRESSURE CONTROL SYSTEM FOR A CLOSED-CYCLE ENGINE

FIELD

The present disclosure relates generally to vehicles having a closed-cycle engine, and more particularly to a pressure control system for a closed-cycle engine that can be incorporated into a vehicle.

BACKGROUND

Large vehicles may be used to efficiently transport cargo. Large, wheeled vehicles pull trailers to transport large volumes of cargo on land, wherein the combination of the vehicle and the trailer can weigh between 30,000 pounds up to 140,000 pounds for a tandem loaded trailer. These vehicles may be referred to as "powered semi-tractors", "semi-tractors", "semis", or "trucks." Trucks may be used on roads such as highways and in urban areas but may also be used on unimproved roads or uneven terrain. In a traditional truck with an internal combustion engine, the internal combustion engine may be sized in the range of 15 liters to provide enough power to propel the vehicle and the trailer.

Such vehicles may be designed with unique configurations capable of integrating one of several different types of engines, such as a closed-cycle engine, to generate electric power for charging an array of batteries under a plurality of operating conditions.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
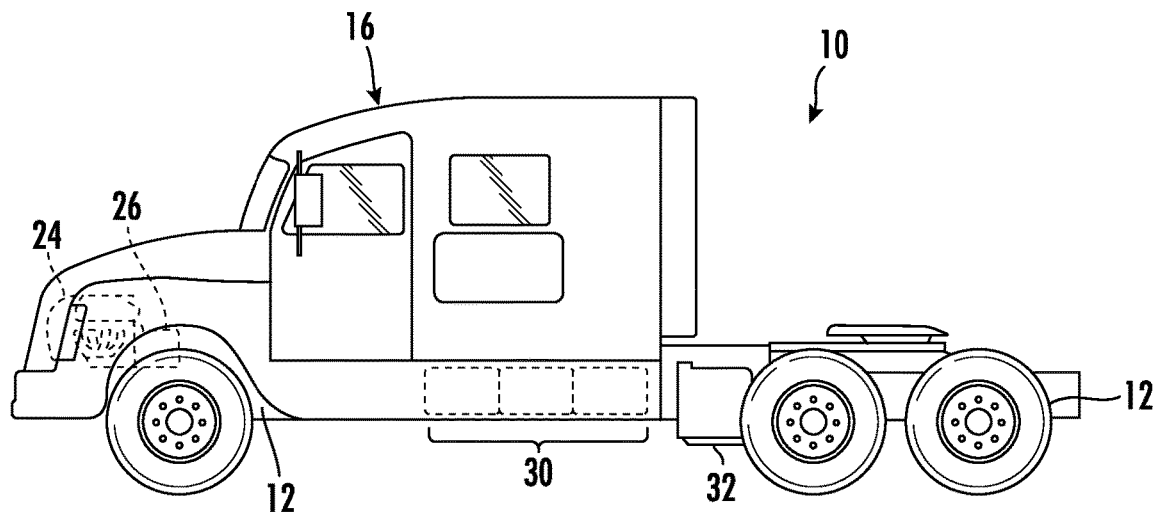
FIG. 1 illustrates a side view of an embodiment of a wheeled vehicle capable of transporting cargo over an extended range according to the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Generally, the present disclosure is directed to a pressure control system for a closed-cycle engine and method of operating same. The closed-cycle engine has a plurality of cylinder-piston assemblies. The pressure control system includes a network of fluid passageways, a plurality of valves in fluid communication with the network of fluid passageways, and one or more air bearings associated with each of the plurality of cylinder-piston assemblies. The air bearings are in fluid communication with the network of fluid passageways. The pressure control system further includes a pressurized tank containing a working fluid. The pressurized tank is selectively fluidly coupled with the cylinder-piston assemblies and the air bearing(s) via the network of fluid passageways and the plurality of valves. Further, the pressure control system includes a pressure control module for controlling the valves for regulating flow of the working fluid to and from the pressurized tank to provide a plurality of operational states for the closed-cycle engine.

In particular, as an example, the pressure control module is configured to perform a non-steady state operation in which a working fluid flows to a pressurized tank: i) to a plurality of sumps defined by respective ones of a plurality of cylinder-piston assemblies of the closed-cycle engine; or ii) to one or more air bearings associated with each one of the plurality of the cylinder-piston assemblies; or iii) both. In addition, the pressure control module is configured to perform, before and/or after performing the non-steady state operation, a steady-state operation in which the working fluid flows through the plurality of sumps and the one or more air bearings along a steady-state loop that is fluidly decoupled from the pressurized tank.

Figure 2:
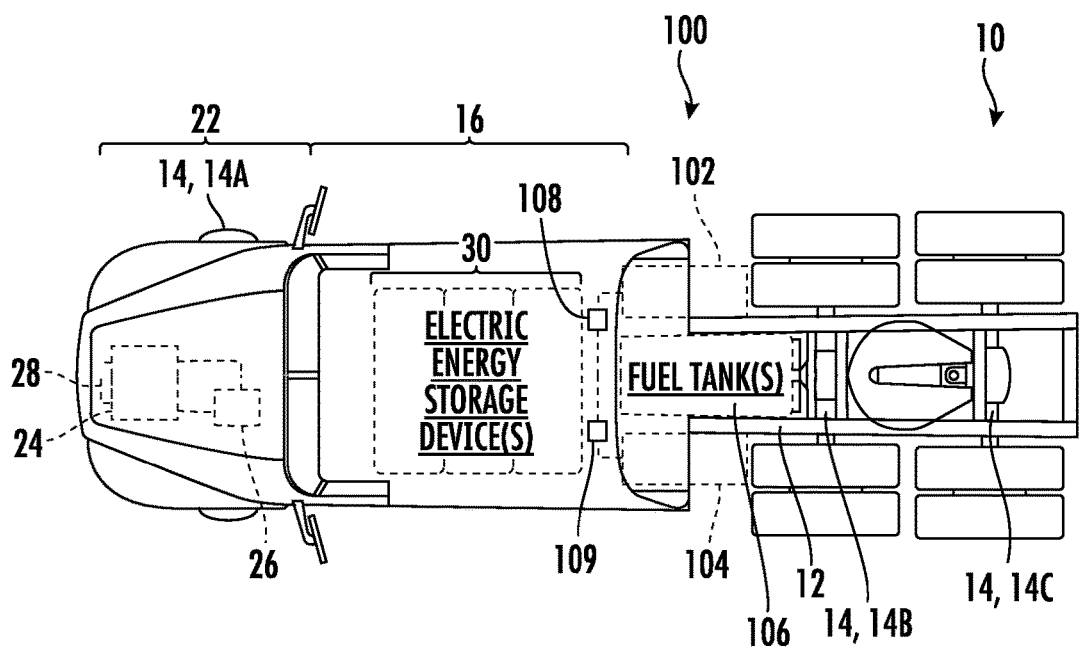
FIG. 2 illustrates a detailed, top view of an embodiment of a wheeled vehicle capable of transporting cargo over an extended range according to the present disclosure.
Figure 3:
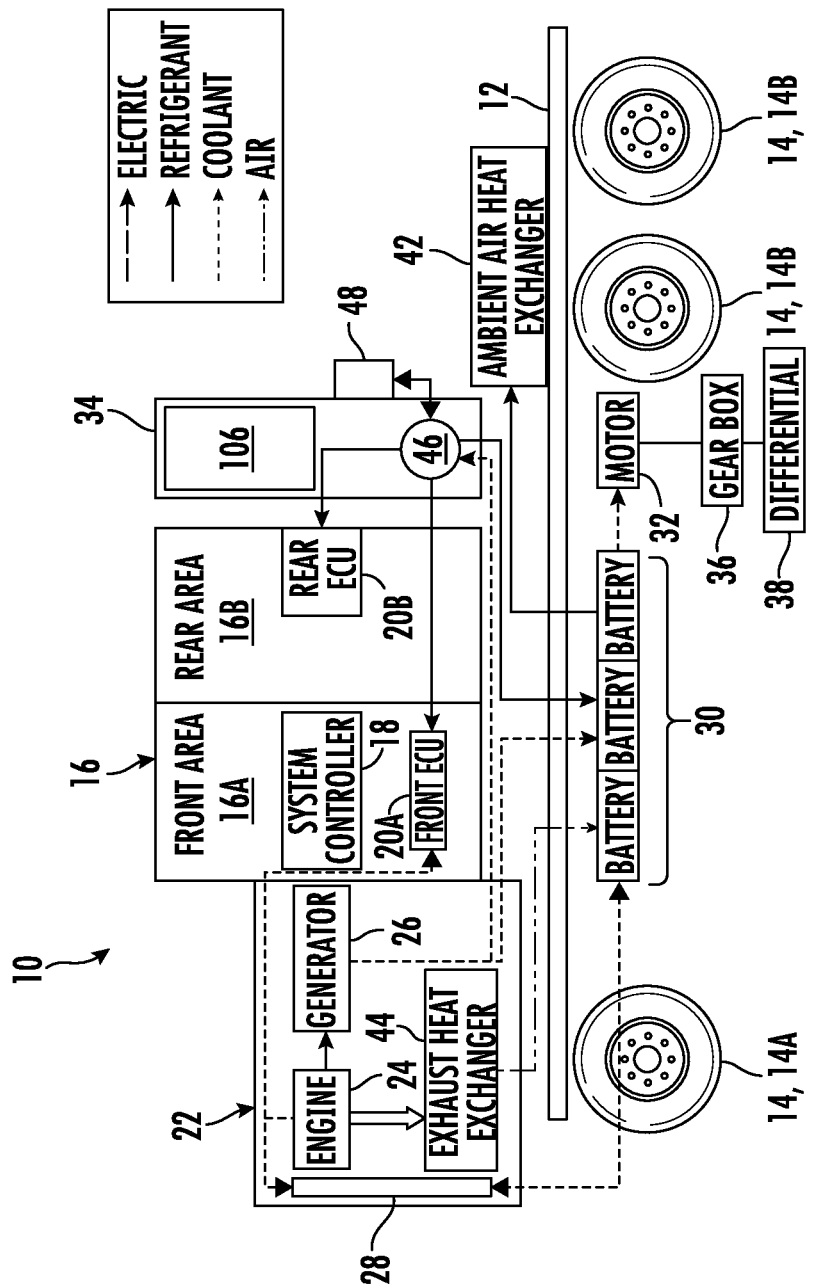
FIG. 3 illustrates a schematic diagram of an embodiment of the vehicle depicted in FIGS. 1 and 2.

Referring now to the drawings, FIGS. 1-3 illustrate various views of an embodiment of a wheeled vehicle according to the present disclosure. In particular, FIGS. 1 and 2 depict side and top partial views of the wheeled vehicle 10, respectively, such as a truck or semi-tractor used to pull one or more trailers with cargo. As shown generally in FIGS. 1-3, components of the vehicle 10 may include, but are not limited to, a chassis 12, which may support multiple axles 14, a cab 16, an engine compartment 22 containing an engine 24 and a generator 26, an array of energy storage devices 30 (e.g., batteries), and a motor/generator 32 coupled to at least one of the axles 14. In addition, in an embodiment, the vehicle 10 may further include rear pack 34 containing fuel tanks (not shown) for the engine 24 or other equipment.

In an embodiment, the chassis 12 may be formed with two frame members such as C-channels arranged parallel to each other. Further, in an embodiment, as shown in FIGS. 2 and 3, the axles 14 coupled to the chassis 12 may include a front axle 14A located under the engine compartment 22 and rear axles 14B and 14C located behind the cab 16.

Moreover, in an embodiment, the engine compartment 22 includes mounts (not shown) for supporting the engine 24 and the generator 26. During operation, the generator 26 receives rotational power from the engine 24 to generate electric power. In an embodiment, as shown in FIGS. 2 and 3, the engine compartment 22 may further contain a radiator 28 positioned at the front of the engine compartment 22 for cooling the engine 24. As such, in an embodiment, coolant, such as glycol or some other anti-freeze liquid, may be circulated through the radiator 28 and the engine 24 to remove heat from the engine 24 and transfer the heat to the ambient air.

Referring particularly to FIG. 3, the cab 16 may further include a system controller 18 for monitoring systems on the vehicle 10 and one or more environmental control units (ECU) 20 having air conditioning and heating options. As depicted in FIG. 3, a front area 16A of the cab 16 may have a front ECU 20A for managing cab temperatures and a rear area 16B of the cab 16 may have a rear ECU 20B for managing rear area temperatures. In such embodiments, the front and rear ECUs 20A, 20B may be fluidly coupled to a compressor 46 and a refrigerant heat exchanger 48 as part of an air conditioning system for the cab 16 and a thermal management system for the energy storage devices 30.

In an embodiment, as shown in FIG. 3, the vehicle 10 may further include an ambient air heat exchanger 42 for heat exchange between the energy storage devices 30 and the ambient air and an exhaust heat exchanger 44 for extracting heat from exhaust gases to heat the energy storage devices 30.

Further, as shown in FIGS. 1-3, an array of energy storage devices 30 may be positioned in various locations on the vehicle 10. In some embodiments, as shown, the energy storage devices 30 may be located on the chassis 12. In some embodiments, the energy storage devices 30 may be located between, under, or around the rails of the chassis 12. Moreover, in an embodiment, the array of energy storage devices 30 may be connected in series, parallel or some combination. Thus, in an embodiment, electric power generated by the generator 26 may be used to charge the array of energy storage devices 30.

Referring to FIGS. 2 and 3, the motor/generator 32 may be coupled to at least one of the axles 14. For example, in some embodiments, the motor/generator 32 may be integrated with one of the axles 14 as an e-axle configuration or located in a hub of a wheel coupled to one of the axles 14 as a hub motor/generator configuration. Moreover, embodiments of the vehicle 10 may include the motor/generator 32 coupled to gearboxes or differentials. For example, as depicted in FIG. 3, the motor/generator 32 may be coupled to a three-speed centralized gearbox 36 with a two-speed rear differential 38 to provide six discrete gear ratios. In some embodiments, the vehicle 10 may be configured with a plurality of motor/generators 32, with a motor/generator 32 coupled to each wheel or pair of wheels. Moreover, as shown in FIGS. 2 and 3, behind the cab 16, the rear pack 34 may be configured to hold one or more fuel tanks 106 for use by the engine 24.

Moreover, as shown particularly in FIG. 2, the vehicle 10 may include an engine assembly 100 having one or more closed-cycle engines 102, 104 fluidly coupled with the fuel tank(s) 106. Furthermore, as shown in FIG. 2, the vehicle 10 may be equipped with one or more power converters 108, 109 coupled to the closed-cycle engines 102, 104 and the array of energy storage devices 30.

Figure 4:
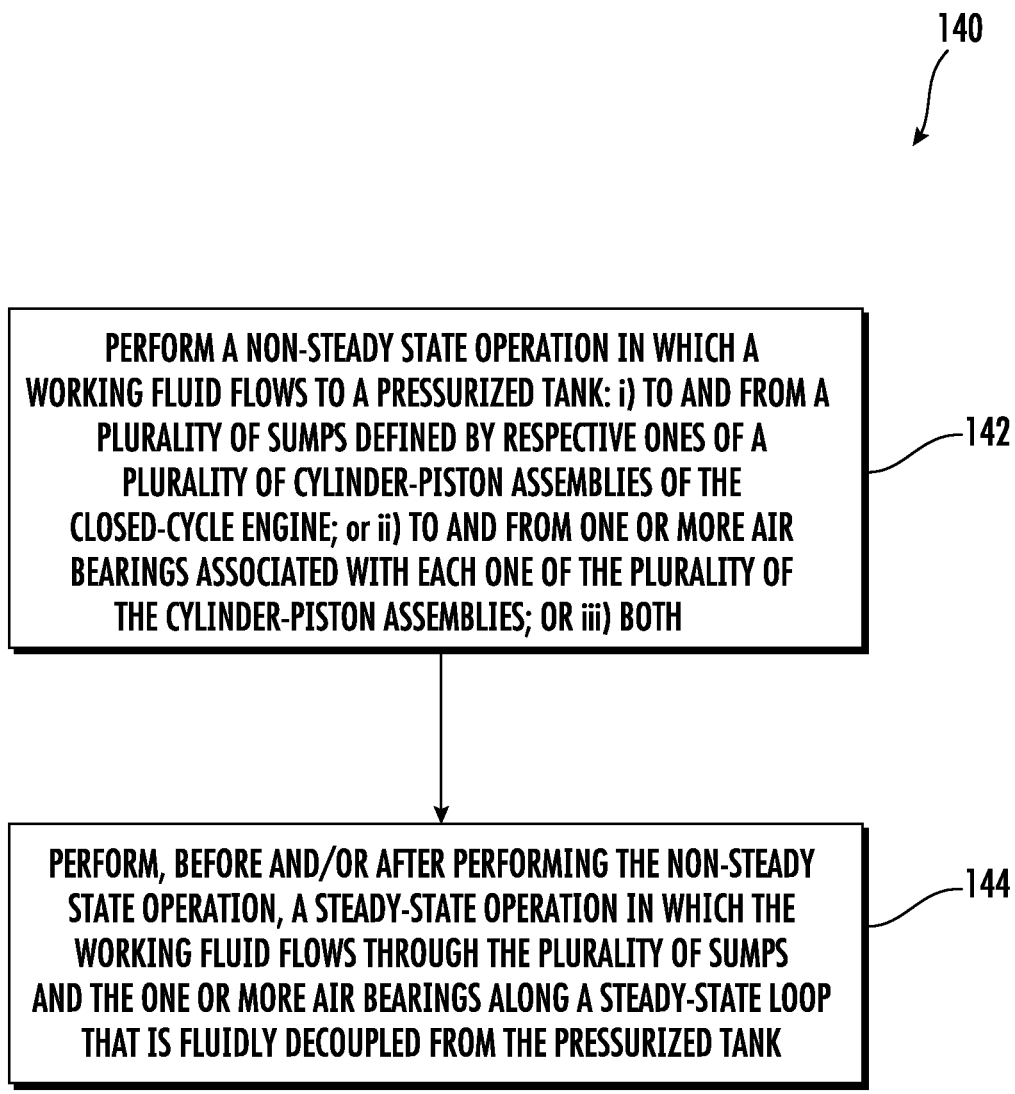
FIG. 4 illustrates a flow diagram of an embodiment of a method of pressurizing a closed-cycle engine according to the present disclosure.

Referring now to FIG. 4, a flow diagram of an embodiment of a method 140 of pressurizing a closed-cycle engine is illustrated. In general, the method 140 will be described herein with reference to the closed-cycle engine 102, 104 illustrated in FIGS. 2 and 5-13. However, it should be appreciated that the disclosed method 140 may be implemented with any engine having any other suitable configurations. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (142), the method 140 includes performing a non-steady state operation (e.g., such as initial pressurization of the closed-cycle engine) in which a working fluid flows to or from a pressurized tank: i) to or from a plurality of sumps defined by respective ones of a plurality of cylinder-piston assemblies of the closed-cycle engine; or ii) to or from one or more air bearings associated with each one of the plurality of the cylinder-piston assemblies; or iii) both. As shown at (144), the method 140 includes performing, before and/or after performing the non-steady state operation, a steady-state operation in which the working fluid flows through the plurality of sumps and the one or more air bearings along a steady-state loop that is fluidly decoupled from a pressurized tank 110, such as a pressurized helium tank.

Figure 5:
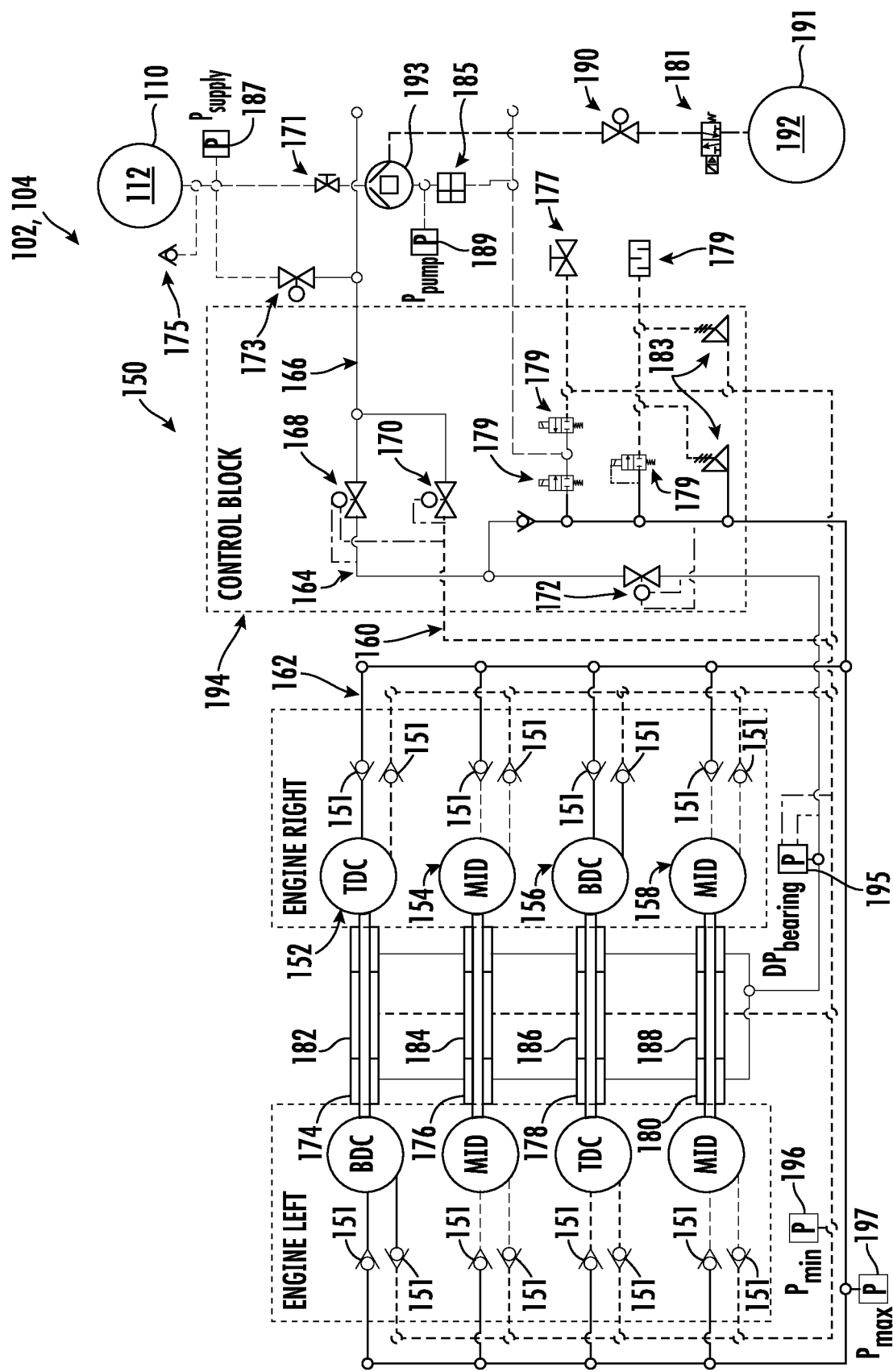
FIG. 5 illustrates a schematic diagram of an embodiment of a pressure control system for a closed-cycle engine that can be incorporated into a vehicle according to the present disclosure.

The method 140 of FIG. 4 can be better understood with reference to FIGS. 2 and 5-13. In particular, as shown in FIG. 5, a schematic diagram of an embodiment of a pressure control system 150 for the closed-cycle engine(s) 102, 104 that can be incorporated into the vehicle 10 according to the present disclosure is illustrated. FIGS. 6-13 illustrate various operational states of the pressure control system 150 for the closed-cycle engine(s) 102, 104 according to the present disclosure. For example, in various embodiments, the operational states for the closed-cycle engine 102, 104 may include, but are not limited to initial pressurization, a steady-state operation, power acceleration, power deceleration, depressurizing operation, refilling of the pressurized tank with the working fluid, or any other operational state.

In particular, FIG. 5 illustrates a schematic diagram of an embodiment of a pressure control system 150 for a closed-cycle engine that can be incorporated into the vehicle 10 according to the present disclosure. Further, as shown, the pressure control system 150 includes a plurality of cylinder-piston assemblies 152, 154, 156, 158. Moreover, as shown, the pressure control system 150 includes a network of fluid passageways 160, 162, 164, 166 and a plurality of valves (or vents) 151, 168, 170, 171, 172, 173, 179, 190 in fluid communication with the network of fluid passageways 160, 162, 164, 166. For example, as shown, the plurality of valves 151, 168, 170, 171, 172, 173, 179, 190 may include, at least, one or more check valves 151, a bearing boost control valve 168, an engine pressure control valve 170, a bearing delta pressure (dP) control valve 172, one or more regulator valves 173, 190, one or more vent valves 179, and/or one or more service valves 171. For example, in an embodiment, the vent valve(s) 179 may include a $P_{MIN}$ vent valve, a $P_{MAX}$ vent valve, an atmospheric vent valve, an exhaust vent valve, etc. Furthermore, in an embodiment, the vent valve(s) 179 may be solenoid valves. In addition, as shown, the pressure control system 150 may also include one or more solenoid valves 181, overpressure safety devices 183, filters 185, etc. Moreover, in an embodiment, the pressure control system 150 may include one or more fill or vent ports 175, 177.

Moreover, as shown, the pressure control system 150 may further include various pressure sensors for monitoring pressure throughout the pressure control system 150. For example, as shown in FIG. 5, the pressure control system 150 may include a supply pressure sensor 187, a pump pressure sensor 189, a dP bearing pressure sensor 195, a $P_{MIN}$ pressure sensor 196, and/or a $P_{MAX}$ pressure sensor 197.

In addition, as shown, the pressure control system 150 includes one or more air bearings 174, 176, 178, 180 associated with each of the plurality of cylinder-piston assemblies 152, 154, 156, 158. Accordingly, as shown, the air bearings 174, 176, 178, 180 are in fluid communication with the network of fluid passageways 160, 162, 164, 166. In addition, as shown, the pressure control system 150 includes a plurality of sumps 182, 184, 186, 188, with one of the plurality of sumps 182, 184, 186, 188 being associated with each of the plurality of cylinder-piston assemblies 152, 154, 156, 158.

Still referring to FIG. 5, as mentioned, the pressure control system 150 further includes a pressurized tank 110 containing a working fluid 112, such as helium. Thus, in an embodiment, the pressurized tank 110 may be selectively fluidly coupled with the plurality of cylinder-piston assemblies 152, 154, 156, 158 (and thus the air bearings 174, 176, 178, 180) via the network of fluid passageways 160, 162, 164, 166 and the plurality of valves 168, 170, 172, 173. In particular embodiments, for example, the pressure control system 150 may include a gas booster pump 193 for pumping the working fluid 112 throughout the network of fluid passageways 160, 162, 164, 166.

In addition, as shown in FIG. 5, the pressure control system 150 may include a compressed air tank 191 containing compressed air 192 for driving the gas booster pump 193. More specifically, in an embodiment, as shown, the compressed air 192 can be supplied from the compressed air tank 191 to the gas booster pump 193 and regulated via a manual regulator valve 190.

Furthermore, in an embodiment, as shown, the pressure control system 150 includes a pressure control module 194 for controlling the plurality of valves 168, 170, 172, 173 for regulating flow of the working fluid 112 to and from the pressurized tank 110 to provide a plurality of operational states for the closed-cycle engine 102, 104. Accordingly, in an embodiment, at least some of the valves (e.g., the bearing boost control valve 168, the engine pressure control valve 170, and/or the bearing delta pressure (dP) control valve 172) of the pressure control system 150 can be controlled via the pressure control module 194.

Figure 6:
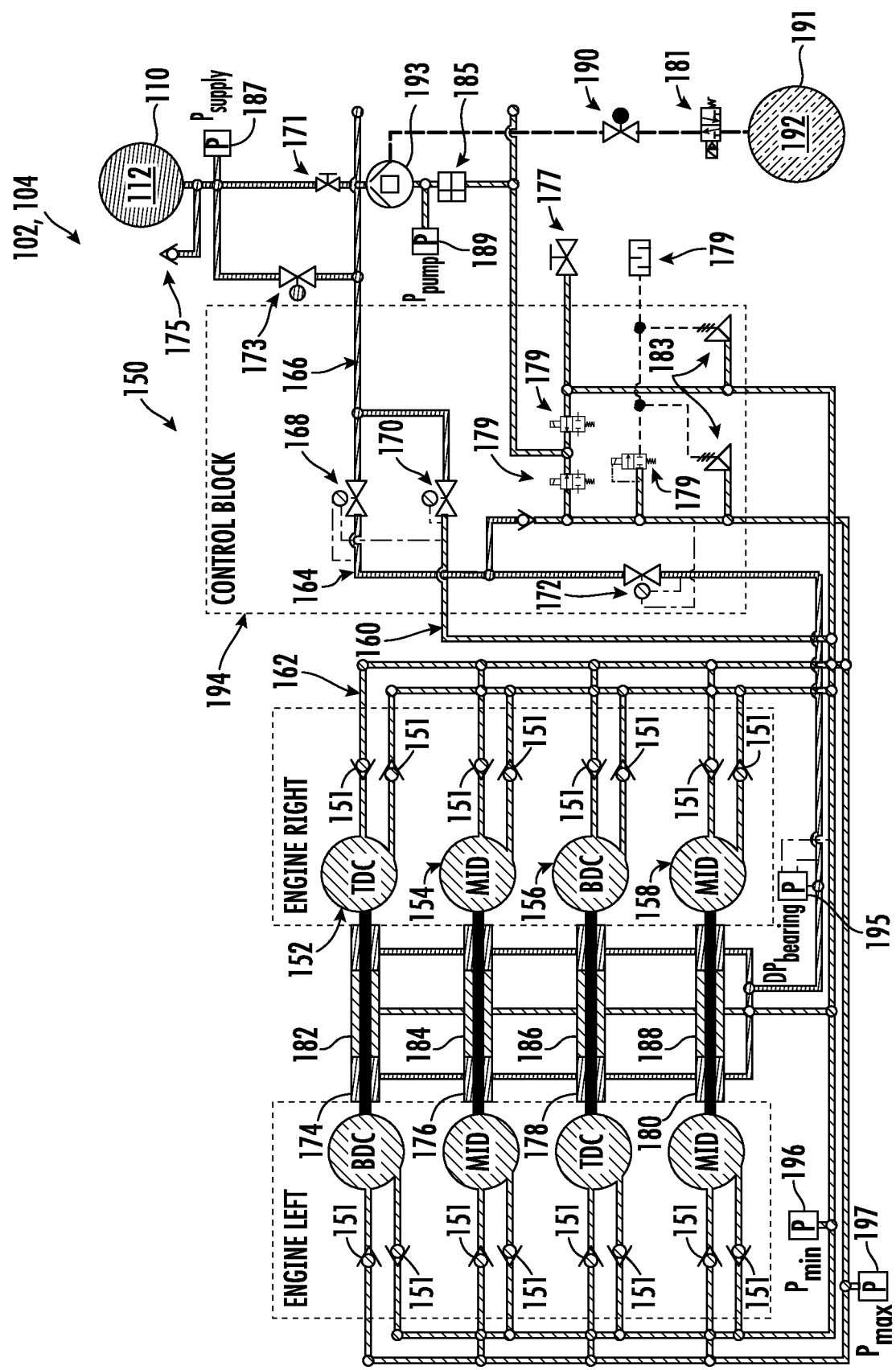
FIG. 6 illustrates a schematic diagram of an embodiment of a pressure control system for a closed-cycle engine that can be incorporated into a vehicle according to the present disclosure, particularly illustrating initial pressurization of the pressure control system.

More specifically, as shown in FIGS. 6-13, various operational states of the pressure control system 150 are illustrated in accordance with the present disclosure. For example, as shown in FIG. 6, a schematic diagram of an embodiment of the pressure control system 150 for the closed-cycle engine 102, 104 that can be incorporated into the vehicle 10 according to the present disclosure is illustrated, particularly illustrating initial pressurization of the pressure control system 150. Further, as shown, in an embodiment, the pressurized tank 110, which is at a higher pressure than the closed-cycle engine 102, 104, provides the working fluid 112 to the closed-cycle engine 102, 104 passively, i.e., by being at a higher pressure. Moreover, in an embodiment, the compressed air tank 191 is configured to supply compressed air 192 to the gas booster pump 193, which runs off air pressure. Furthermore, the gas booster pump 193 is configured to pump the working fluid 112 from the closed-cycle engine 102, 104 to the pressurized tank 110. Moreover, as shown, during initial pressurization of the pressure control system 150, the pressure control module 194 is configured to open the bearing boost control valve 168, the engine pressure control valve 170, the bearing delta pressure (dP) control valve 172 to allow the working fluid 112 to flow through all of the cylinder-piston assemblies 152, 154, 156, 158 and the network of fluid passageways 160, 162, 164, 166 and circulate back to the pressurized tank 110 as needed to maintain a target pressure.

Figure 7:
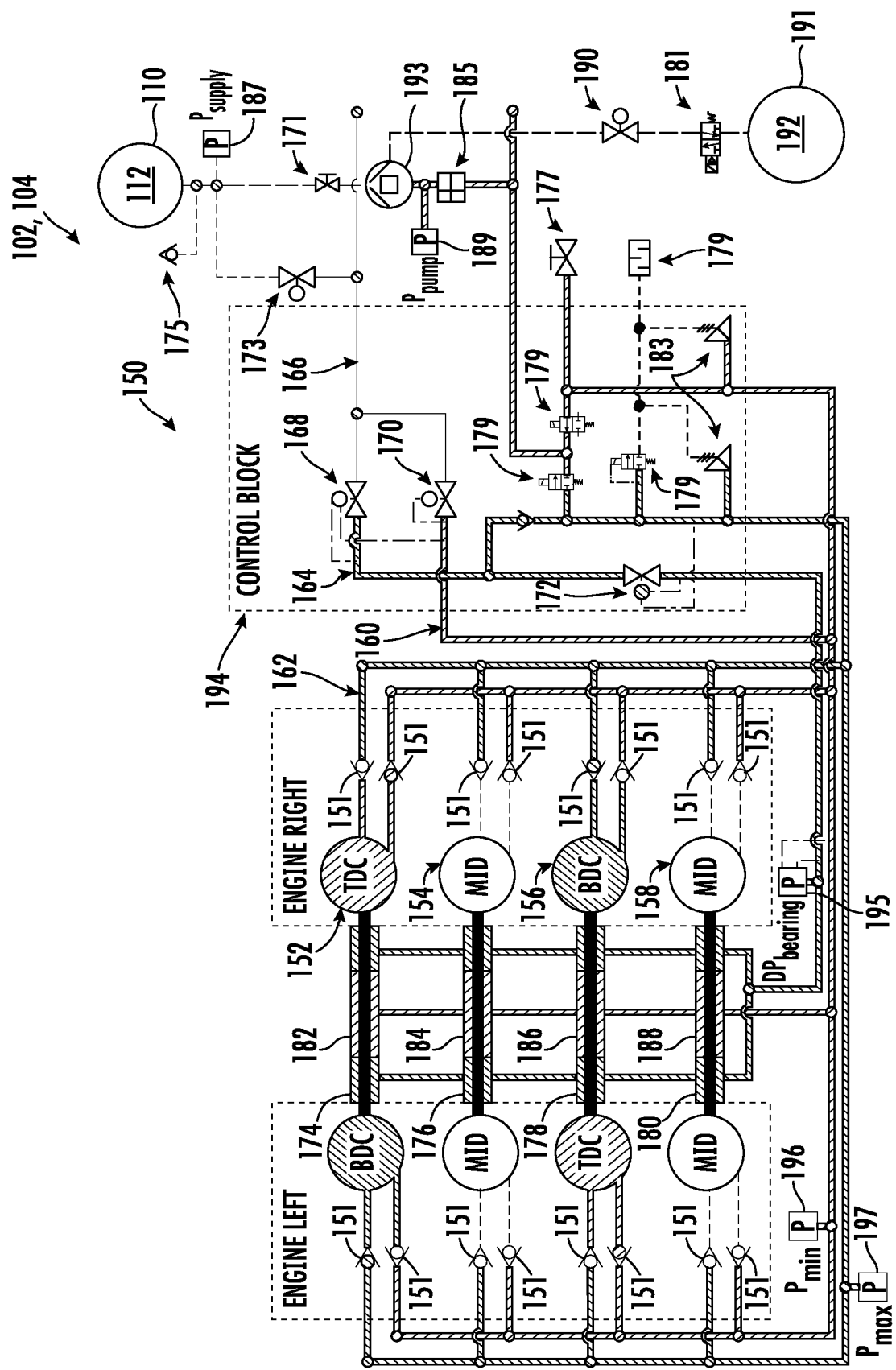
FIG. 7 illustrates a schematic diagram of an embodiment of a pressure control system for a closed-cycle engine that can be incorporated into a vehicle according to the present disclosure, particularly illustrating steady-state operation of the pressure control system with passive bearing supply.

Once the initial pressurization of the pressure control system 150 is completed, the pressure control system 150 reaches steady state operation and a steady-state loop of the pressure control system 150 is fluidly decoupled from the pressurized tank 110. For example, FIG. 7 illustrates a schematic diagram of an embodiment of the pressure control system 150 according to the present disclosure, particularly illustrating steady-state operation of the pressure control system 150 with passive bearing supply. In particular, as shown in the illustrated embodiment, the working fluid 112 can be provided to the plurality of sumps 182, 184, 186, 188 and the air bearings 174, 176, 178, 180 via engine operation. In particular, in an embodiment, the check valves 151 allow the air bearings to be passively supplied with the working fluid 112 during steady state operation. Further, in an embodiment, during steady-state operation, an amount of the working fluid 112 that can be provided to the air bearings 174, 176, 178, 180 is generally limited to the cycle delta pressure (dP) (e.g., $P_{MAX}$-$P_{MIN}$). Moreover, in such embodiments, the only auxiliary work in ($W_{IN}$) required is power for the dP control valve 172. In other words, in an embodiment, the passively fed air bearings 174, 176, 178, 180 can operate off the pressure ratio of the closed-cycle engine 102, 104. Moreover, in an embodiment, all valves in the pressure control system 150 can be inactive with the exception to the dP control valve 172 for the air bearings 174, 176, 178, 180 to be passively fed by the cylinder-piston assemblies 152, 154, 156, 158.

Figure 8:
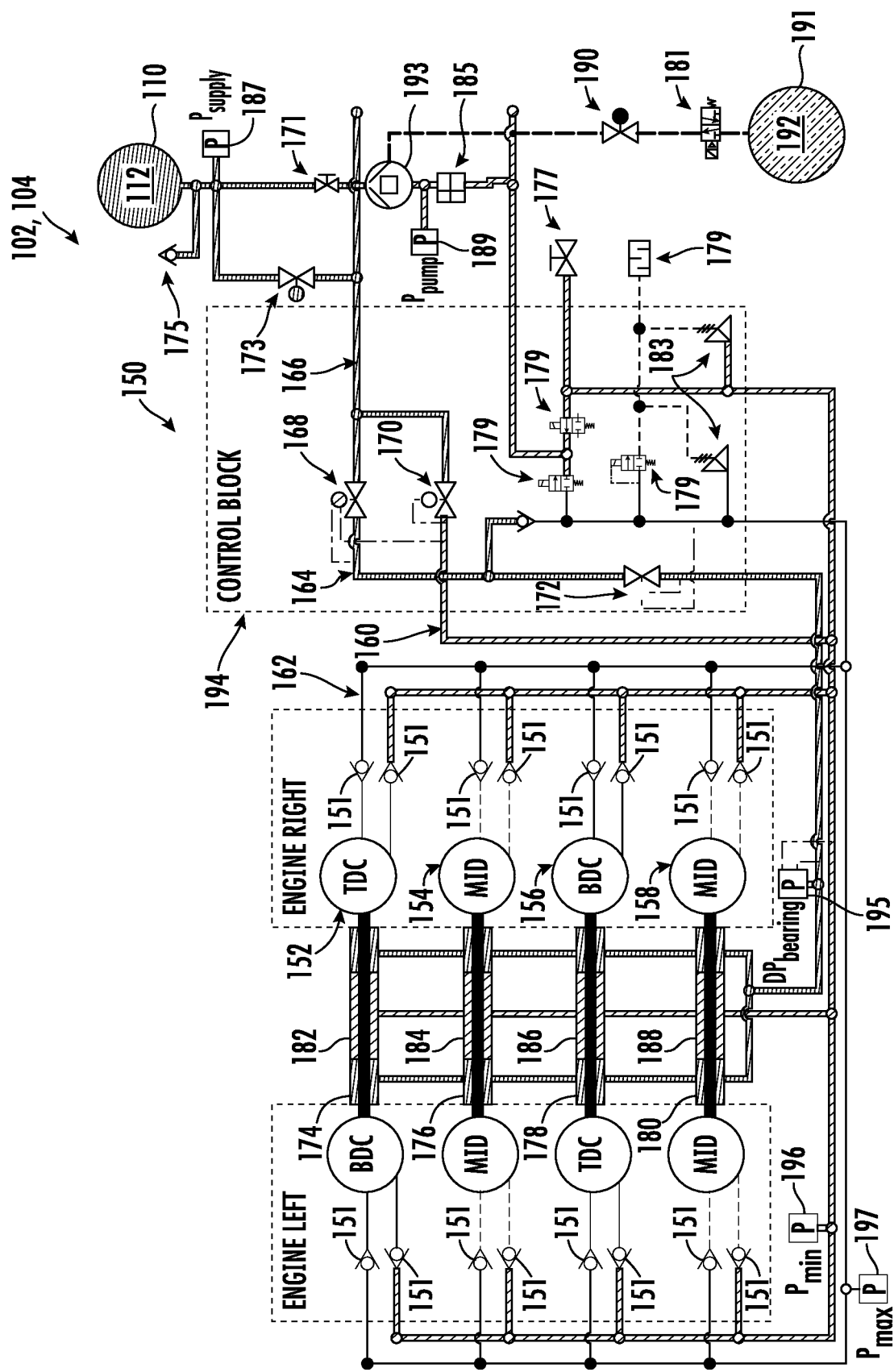
FIG. 8 illustrates a schematic diagram of an embodiment of a pressure control system for a closed-cycle engine that can be incorporated into a vehicle according to the present disclosure, particularly illustrating steady-state operation of the pressure control system with bearing boost.

In another embodiment, as shown in FIG. 8, a schematic diagram of an embodiment of the pressure control system 150 according to the present disclosure is illustrated, particularly illustrating steady-state operation of the pressure control system 150 with bearing boost. In particular, as shown in the illustrated embodiment, the working fluid 112 can be provided to the plurality of sumps 182, 184, 186, 188 and the air bearings 174, 176, 178, 180 via the pumping of the closed-cycle engine 102, 104. Moreover, in an embodiment, the pressure control module 194 is configured to regulate the working fluid 112 to the plurality of sumps 182, 184, 186, 188 and the air bearings 174, 176, 178, 180 via the bearing boost control valve 168 and/or the engine pressure control valve 170. In such embodiments, steady state operation with bearing boost is capable of achieving high dP and does not interact with the thermodynamic cycle.

Figure 9:
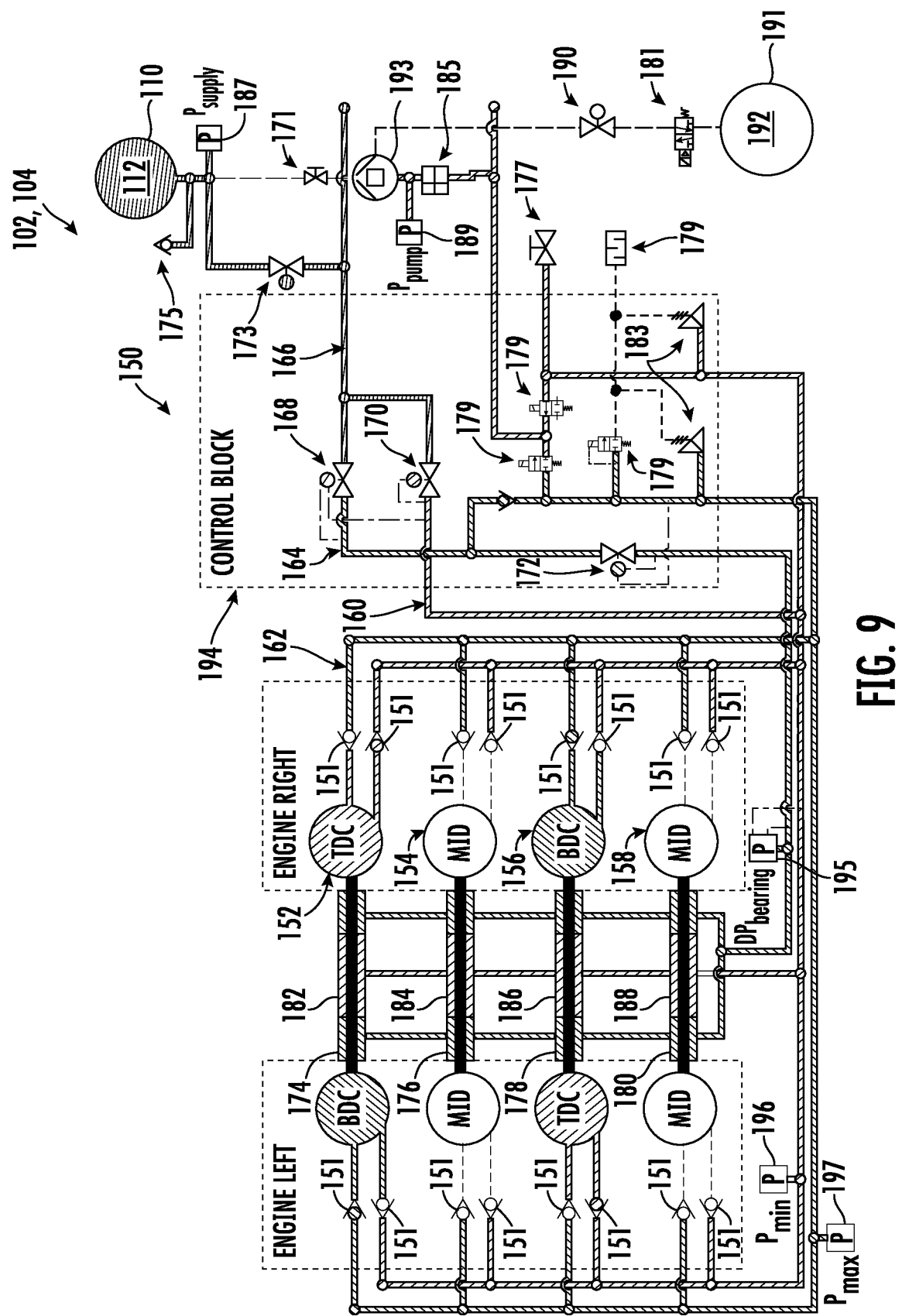
FIG. 9 illustrates a schematic diagram of an embodiment of a pressure control system for a closed-cycle engine that can be incorporated into a vehicle according to the present disclosure, particularly illustrating power acceleration of the pressure control system.

Referring now to FIG. 9, a schematic diagram of an embodiment of the pressure control system 150 according to the present disclosure is illustrated, particularly illustrating power acceleration of the pressure control system 150. In such embodiments, as an example, the pressure control module 194 is configured to perform a power acceleration operation in which a pressure in the closed-cycle engine 102, 104 is increased by increasing an amount of the working fluid 112 entering one or more of the plurality of cylinder-piston assemblies 152, 154, 156, 158. In particular, as shown in the illustrated embodiment, the mean pressure of the closed-cycle engine 102, 104 can be increased by the pressurized tank 110. For example, in an embodiment, as shown, the working fluid 112 entering the one or more of the plurality of cylinder-piston assemblies 152, 154, 156, 158 enters the cycle at a top dead center (TDC) position (i.e., $P_{MIN}$), as shown at 198, of one or more of the plurality of cylinder-piston assemblies 152, 154, 156, 158. Further, in an embodiment, the working fluid 112 enters the closed-cycle engine 102, 104 through the check valves 151, which will passively open and close as the plurality of cylinder-piston assemblies 152, 154, 156, 158 move back and forth.

Figure 10:
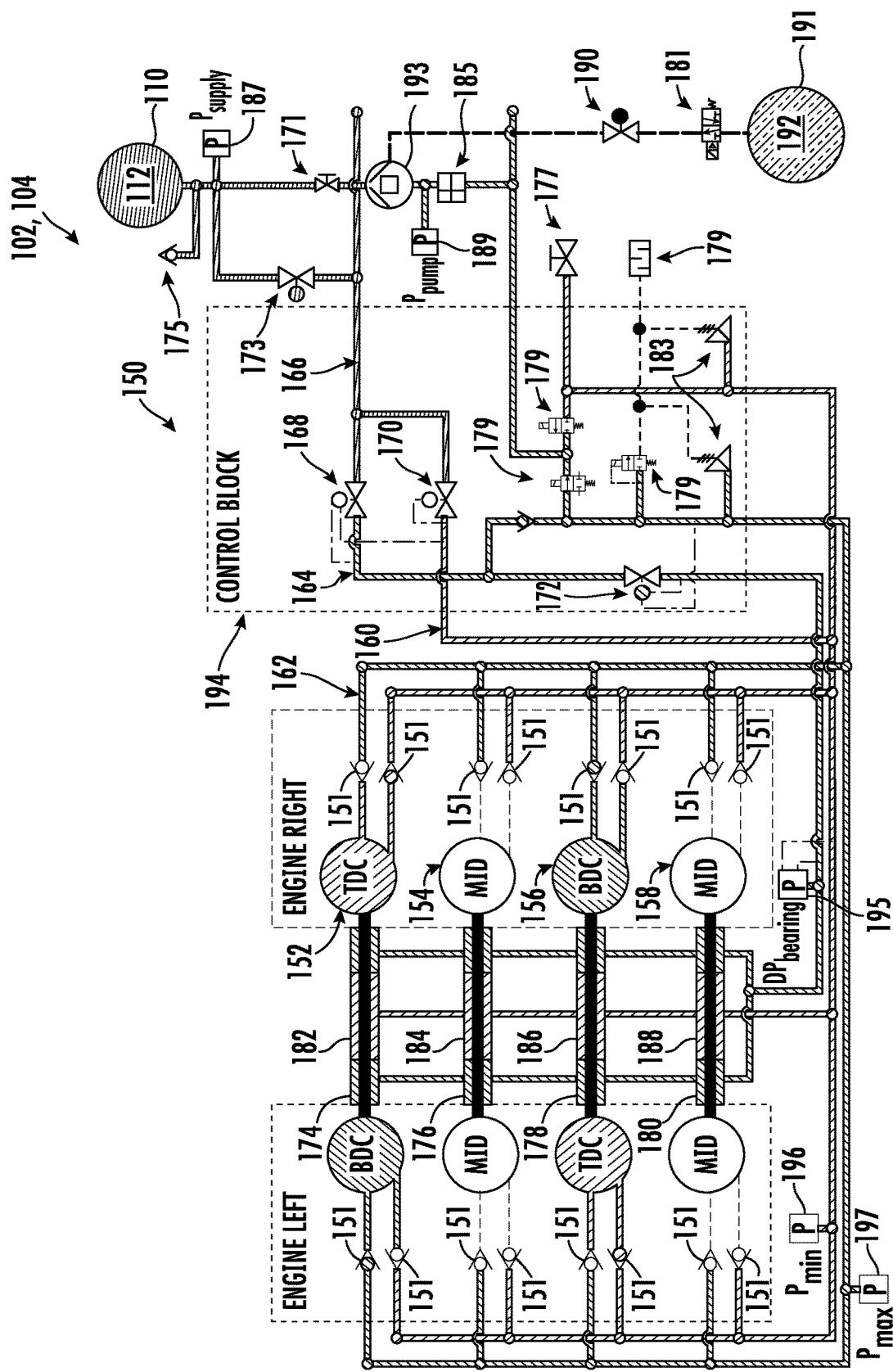
FIG. 10 illustrates a schematic diagram of an embodiment of a pressure control system for a closed-cycle engine that can be incorporated into a vehicle according to the present disclosure, particularly illustrating normal power deceleration of the pressure control system.
Figure 11:
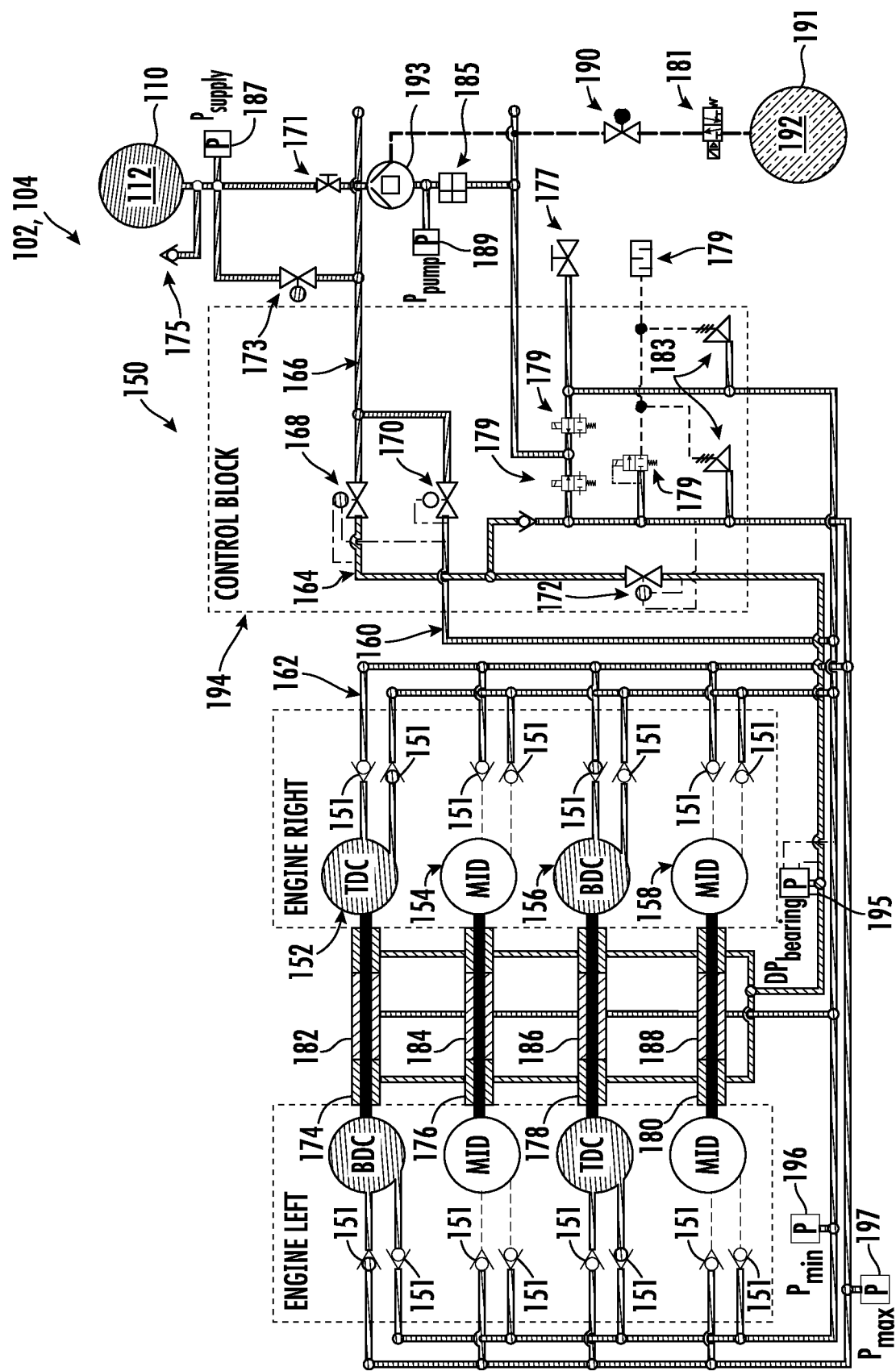
FIG. 11 illustrates a schematic diagram of an embodiment of a pressure control system for a closed-cycle engine that can be incorporated into a vehicle according to the present disclosure, particularly illustrating rapid power deceleration of the pressure control system.
Figure 12:
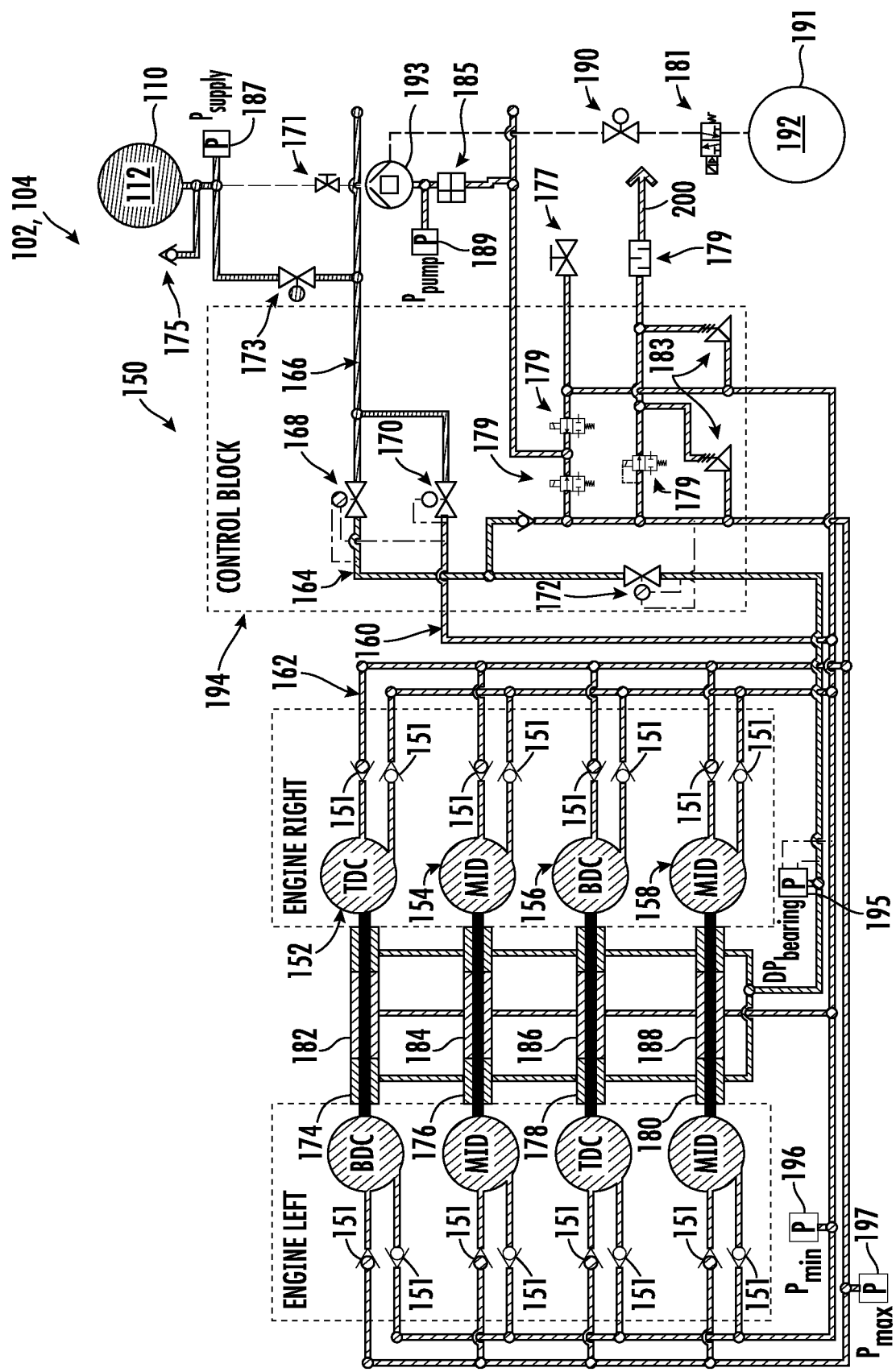
FIG. 12 illustrates a schematic diagram of an embodiment of a pressure control system for a closed-cycle engine that can be incorporated into a vehicle according to the present disclosure, particularly illustrating emergency power deceleration of the pressure control system.

Referring now to FIGS. 10-12, various schematic diagrams of embodiments of the pressure control system 150 according to the present disclosure are illustrated. In particular, FIG. 10 illustrates a schematic diagram of normal power deceleration of the pressure control system 150. FIG. 11 illustrates a schematic diagram of an embodiment of rapid power deceleration of the pressure control system 150. FIG. 12 illustrates a schematic diagram of an embodiment of emergency power deceleration of the pressure control system 150.

In particular, as shown in FIG. 10, for normal power deceleration of the pressure control system 150, the pressure control module 194 is configured to perform a normal power deceleration operation in which a pressure in the closed-cycle engine 102, 104 is decreased by pumping an amount of the working fluid 112 exiting one or more of the cylinder-piston assemblies 152, 154, 156, 158 back into the pressurized tank 110. In such embodiments, as an example, the amount of the working fluid 112 being pumped back into the pressurized tank 110 may exit the cycle from one or more of the cylinder-piston assemblies 152, 154, 156, 158 at a bottom dead center (BDC) position (i.e., $P_{MAX}$), as shown at 197 during operation of the closed-cycle engine 102, 104.

As shown in FIGS. 11 and 12, some power decelerations may require more aggressive actions to reduce the power in the pressure control system 150 more quickly. For example, in an embodiment, the pressure control module 194 is configured to perform a power deceleration operation in which a pressure in the closed-cycle engine 102, 104 is decreased by short-circuiting the closed-cycle engine 102, 104 between TDC and BDC to instantly reduce power in the closed-cycle engine 102, 104. More specifically, in an embodiment, as shown in FIG. 11, for rapid power deceleration of the pressure control system 150, the pressure control module 194 is configured to short-circuit the cycle between $P_{MAX}$ and $P_{MIN}$, which instantly reduces power produced by the pressure control system 150. In addition, in such embodiments, the pressure control module 194 is configured to control the gas booster pump 193 to draw or remove an amount of the working fluid 112 out from the plurality of sumps 182, 184, 186, 188 of the plurality of cylinder-piston assemblies 152, 154, 156, 158 and back into the pressurized tank 110. In other words, in such embodiments, the gas booster pump 193 is configured to remove some of the working fluid 112 from the cycle and back to the pressurized tank 110.

As shown in FIG. 12, for emergency power deceleration of the pressure control system 150, the pressure control module 194 is configured to short-circuit the cycle between $P_{MAX}$ and $P_{MIN}$, which instantly reduces power produced by the pressure control system 150. In addition, in such embodiments, as shown at 200, the pressure control system 150 is vented to the atmosphere, e.g., via atmospheric vent 179.

Figure 13:
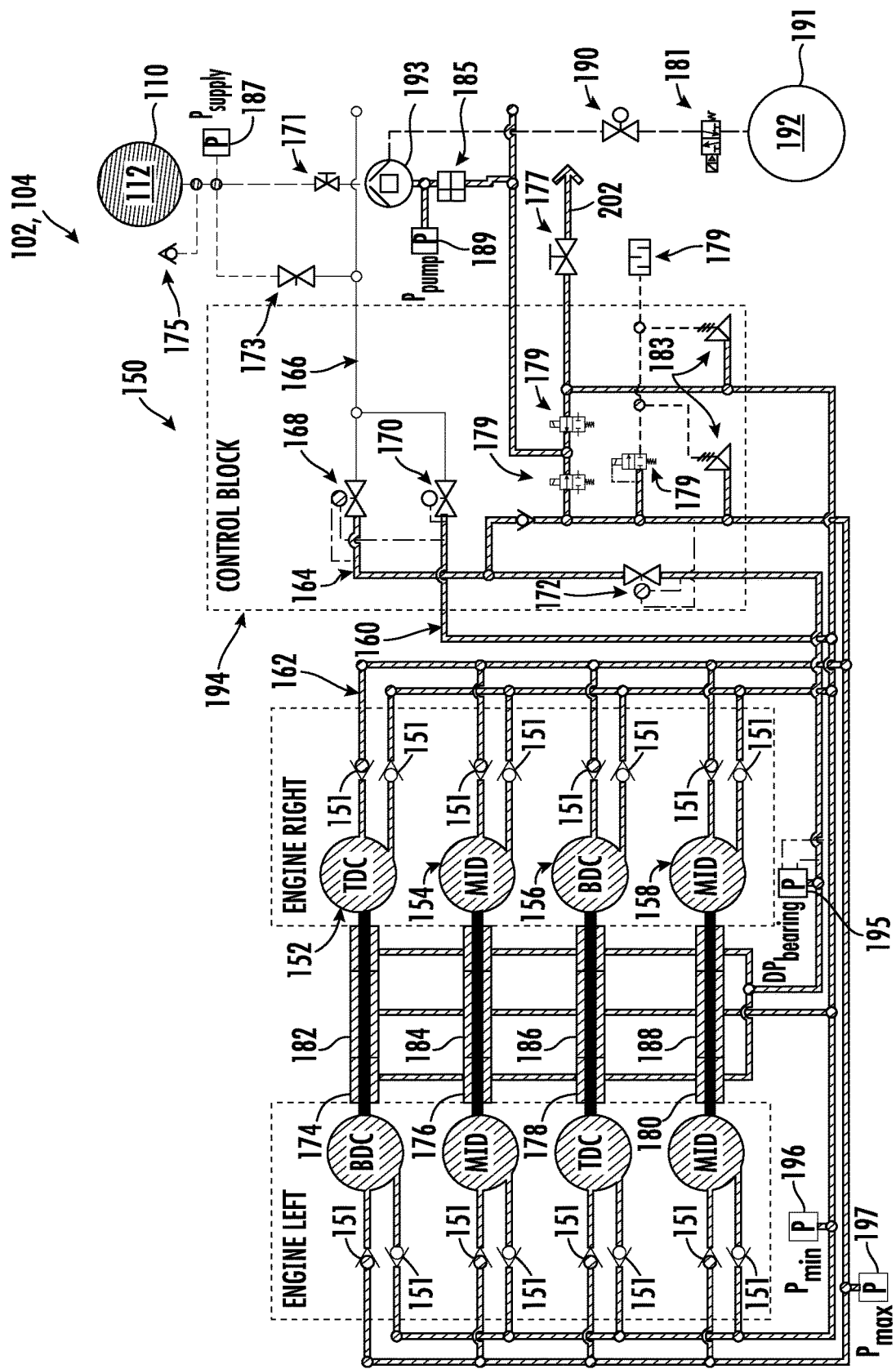
FIG. 13 illustrates a schematic diagram of an embodiment of a pressure control system for a closed-cycle engine that can be incorporated into a vehicle according to the present disclosure, particularly illustrating depressurization of the pressure control system.

Referring now to FIG. 13, a schematic diagram of an embodiment of the pressure control system 150 according to the present disclosure is illustrated, particularly illustrating depressurization of the pressure control system. In such embodiments, as shown, the closed-cycle engine 102, 104 is off or inactive, and all circuits are pressure balanced. Moreover, in an embodiment, as shown at 202, internal pressure can bleed via manual vent port 177.

Figure 14:
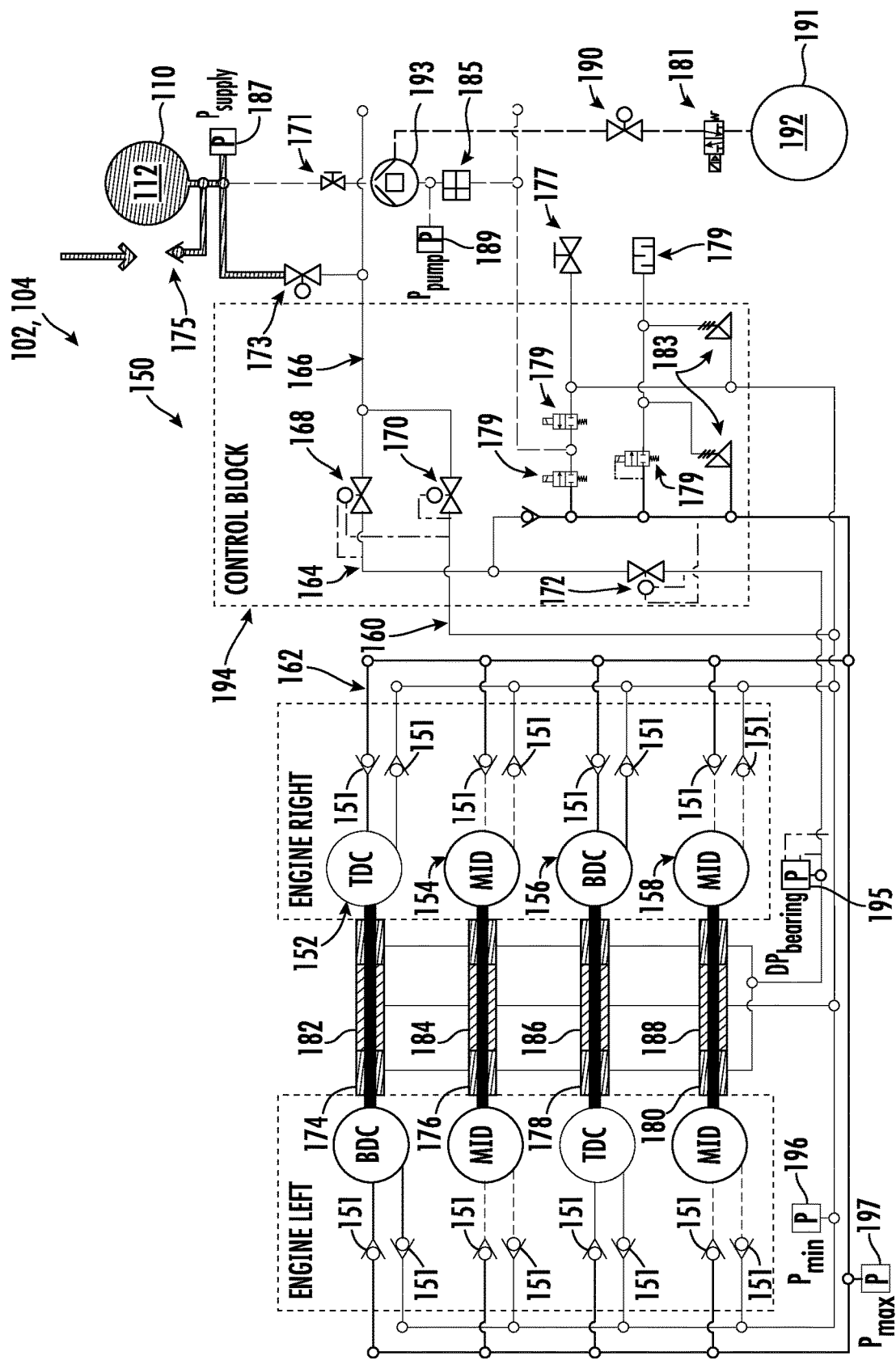
FIG. 14 illustrates a schematic diagram of an embodiment of a pressure control system for a closed-cycle engine that can be incorporated into a vehicle according to the present disclosure, particularly illustrating refilling of a pressurized tank of working fluid of the pressure control system.

Referring now to FIG. 14 a schematic diagram of an embodiment of the pressure control system 150 according to the present disclosure is illustrated, particularly illustrating refilling of the pressurized tank 110 of the working fluid 112 of the pressure control system 150. In such embodiments, as shown, the closed-cycle engine 102, 104 is off or inactive, and the pressurized tank 110 is fluidly isolated from the rest of the pressure control system 150. In such embodiments, the pressurized tank 110 can be refilled with the working fluid 112, e.g., via fill port 175.

Further aspects are provided by the subject matter of the following clauses:

A method of pressurizing a closed-cycle engine, the method comprising: performing a non-steady state operation in which a working fluid flows to or from a pressurized tank: i) to or from a plurality of sumps defined by respective ones of a plurality of cylinder-piston assemblies of the closed-cycle engine; or ii) to or from one or more air bearings associated with each one of the plurality of the cylinder-piston assemblies; or iii) both; and performing, before and/or after performing the non-steady state operation, a steady-state operation in which the working fluid flows through the plurality of sumps and the one or more air bearings along a steady-state loop that is fluidly decoupled from the pressurized tank.

The method of any preceding clause, wherein performing the steady-state operation in which the working fluid flows through the plurality of sumps and the one or more air bearings further comprises allowing the working fluid to passively flow to the one or more air bearings.

The method of any preceding clause, wherein performing the steady-state operation in which the working fluid flows through the plurality of sumps and the one or more air bearings further comprises: pumping the working fluid to the one or more air bearings via one or more pumps; and regulating the working fluid to the one or more air bearings via a bearing boost control valve.

The method of any preceding clause, wherein performing the steady-state operation in which the working fluid flows through the plurality of sumps and the one or more air bearings further comprises: pumping the working fluid to the plurality of sumps via the one or more pumps; and regulating the working fluid to the plurality of sumps via an engine pressure control valve.

The method of any preceding clause, wherein the non-steady state operation comprises initial pressurization of the closed-cycle engine.

The method of any preceding clause, further comprising performing a power acceleration operation in which a pressure in the closed-cycle engine is increased by increasing an amount of the working fluid entering one or more of the plurality of cylinder-piston assemblies.

The method of any preceding clause, wherein the working fluid entering the one or more of the plurality of cylinder-piston assemblies enters at a top dead center position of one or more of the plurality of cylinder-piston assemblies.

The method of any preceding clause, further comprising performing a normal power deceleration operation in which a pressure in the closed-cycle engine is decreased by pumping an amount of the working fluid exiting the one or more of the plurality of cylinder-piston assemblies back into the pressurized tank.

The method of any preceding clause, wherein the amount of the working fluid exiting the one or more of the plurality of cylinder-piston assemblies exits at a bottom dead center position of one or more of the plurality of cylinder-piston assemblies.

The method of any preceding clause, further comprising performing a power deceleration operation in which a pressure in the closed-cycle engine is decreased by short-circuiting the closed-cycle engine between top dead center and bottom dead center to instantly reduce power in the closed-cycle engine. The method of any preceding clause, wherein, when the power deceleration operation is a rapid power deceleration operation, the method further comprises drawing, via a gas booster pump, an amount of the working fluid out from the plurality of sumps of the plurality of cylinder-piston assemblies and back into the pressurized tank.

The method of any preceding clause, when the power deceleration operation is an emergency power deceleration operation, the method further comprises venting the closed-cycle engine to atmosphere.

The method of any preceding clause, further comprising performing a depressurizing operation in which the closed-cycle engine is off and all circuits of the closed-cycle engine are pressure balanced.

The method of any preceding clause, further comprising, during the depressurizing operation, bleeding an internal pressure of the closed-cycle engine via a manual vent valve.

The method of any preceding clause, further comprising fluidly isolating the pressurized tank and refilling the pressurized tank via a fill port with the working fluid when the closed-cycle engine is off.

The method of any preceding clause, wherein the working fluid comprises helium.

A pressure control system for a closed-cycle engine, the closed-cycle engine having a plurality of cylinder-piston assemblies, the pressure control system comprising: a network of fluid passageways; a plurality of valves in fluid communication with the network of fluid passageways; one or more air bearings associated with each of the plurality of cylinder-piston assemblies, the one or more air bearings in fluid communication with the network of fluid passageways; and a pressurized tank containing a working fluid, the pressurized tank being selectively fluidly coupled with the plurality of cylinder-piston assemblies and the one or more air bearings via the network of fluid passageways and the plurality of valves; and a pressure control module for controlling the plurality of valves for regulating flow of the working fluid to and from the pressurized tank to provide a plurality of operational states for the closed-cycle engine.

The pressure control system of any preceding clause, wherein the plurality of valves comprises, at least, a bearing boost valve for regulating pressure of the one or more air bearings and an engine pressure control valve for regulating pressure of the closed-cycle engine.

The pressure control system of any preceding clause, wherein the plurality of operational states for the closed-cycle engine comprises at least one of initial pressurization, a steady-state operation, power acceleration, power deceleration, depressurizing operation, or refilling of the pressurized tank with the working fluid.

The pressure control system of any preceding clause, further comprising one or more pumps for circulating the working fluid to and from the pressurized tank and throughout the network of fluid passageways.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method of pressurizing a closed-cycle engine, the method comprising:
   performing a non-steady state operation in which a working fluid flows to or from a pressurized tank: i) to or from a plurality of sumps defined by respective ones of a plurality of cylinder-piston assemblies of the closed-cycle engine; or ii) to or from one or more air bearings associated with each one of the plurality of the cylinder-piston assemblies; or iii) both; and
   performing, before and/or after performing the non-steady state operation, a steady-state operation in which the working fluid flows through the plurality of sumps and the one or more air bearings along a steady-state loop that is fluidly decoupled from the pressurized tank.

2. The method of claim 1, wherein performing the steady-state operation in which the working fluid flows through the plurality of sumps and the one or more air bearings further comprises allowing the working fluid to passively flow to the one or more air bearings.

3. The method of claim 1, wherein performing the steady-state operation in which the working fluid flows through the plurality of sumps and the one or more air bearings further comprises:
   pumping the working fluid to the one or more air bearings via one or more pumps; and
   regulating the working fluid to the one or more air bearings via a bearing boost control valve.

4. The method of claim 3, wherein performing the steady-state operation in which the working fluid flows through the plurality of sumps and the one or more air bearings further comprises:
pumping the working fluid to the plurality of sumps via the one or more pumps; and
regulating the working fluid to the plurality of sumps via an engine pressure control valve.

5. The method of claim 1, wherein the non-steady state operation comprises initial pressurization of the closed-cycle engine.

6. The method of claim 1, further comprising performing a power acceleration operation in which a pressure in the closed-cycle engine is increased by increasing an amount of the working fluid entering one or more of the plurality of cylinder-piston assemblies.

7. The method of claim 6, wherein the working fluid entering the one or more of the plurality of cylinder-piston assemblies enters at a top dead center position of one or more of the plurality of cylinder-piston assemblies.

8. The method of claim 1, further comprising performing a normal power deceleration operation in which a pressure in the closed-cycle engine is decreased by pumping an amount of the working fluid exiting the one or more of the plurality of cylinder-piston assemblies back into the pressurized tank.

9. The method of claim 8, wherein the amount of the working fluid exiting the one or more of the plurality of cylinder-piston assemblies exits at a bottom dead center position of one or more of the plurality of cylinder-piston assemblies.

10. The method of claim 1, further comprising performing a power deceleration operation in which a pressure in the closed-cycle engine is decreased by short-circuiting the closed-cycle engine between top dead center and bottom dead center to instantly reduce power in the closed-cycle engine.

11. The method of claim 10, wherein, when the power deceleration operation is a rapid power deceleration operation, the method further comprises drawing, via a gas booster pump, an amount of the working fluid out from the plurality of sumps of the plurality of cylinder-piston assemblies and back into the pressurized tank.

12. The method of claim 9, when the power deceleration operation is an emergency power deceleration operation, the method further comprises venting the closed-cycle engine to atmosphere.

13. The method of claim 1, further comprising performing a depressurizing operation in which the closed-cycle engine is off and all circuits of the closed-cycle engine are pressure balanced.

14. The method of claim 13, further comprising, during the depressurizing operation, bleeding an internal pressure of the closed-cycle engine via a manual vent valve.

15. The method of claim 1, further comprising fluidly isolating the pressurized tank and refilling the pressurized tank via a fill port with the working fluid when the closed-cycle engine is off.

16. The method of claim 1, wherein the working fluid comprises helium.

17. A pressure control system for a closed-cycle engine, the closed-cycle engine having a plurality of cylinder-piston assemblies, the pressure control system comprising:
a network of fluid passageways;
a plurality of valves in fluid communication with the network of fluid passageways;
one or more air bearings associated with each of the plurality of cylinder-piston assemblies, the one or more air bearings in fluid communication with the network of fluid passageways; and
a pressurized tank containing a working fluid, the pressurized tank being selectively fluidly coupled with the plurality of cylinder-piston assemblies and the one or more air bearings via the network of fluid passageways and the plurality of valves; and
a pressure control module for controlling the plurality of valves for regulating flow of the working fluid to and from the pressurized tank to provide a plurality of operational states for the closed-cycle engine.

18. The pressure control system of claim 17, wherein the plurality of valves comprises, at least, a bearing boost valve for regulating pressure of the one or more air bearings and an engine pressure control valve for regulating pressure of the closed-cycle engine.

19. The pressure control system of claim 17, wherein the plurality of operational states for the closed-cycle engine comprises at least one of initial pressurization, a steady-state operation, power acceleration, power deceleration, depressurizing operation, or refilling of the pressurized tank with the working fluid.

20. The pressure control system of claim 17, further comprising one or more pumps for circulating the working fluid to and from the pressurized tank and throughout the network of fluid passageways.

* * * * *